(12) United States Patent
Daniels et al.

(10) Patent No.: US 9,377,107 B2
(45) Date of Patent: Jun. 28, 2016

(54) SEALS HAVING TEXTURED PORTIONS FOR PROTECTION IN SPACE ENVIRONMENTS

(71) Applicant: The University of Akron, Akron, OH (US)

(72) Inventors: Christopher Daniels, Akron, OH (US); Nicholas Garafolo, Akron, OH (US)

(73) Assignee: The University of Akron, Akron, OH (US)

( * ) Notice: Subject to any disclaimer, the term of this patent is extended or adjusted under 35 U.S.C. 154(b) by 105 days.

(21) Appl. No.: 14/352,194

(22) PCT Filed: Oct. 19, 2012

(86) PCT No.: PCT/US2012/061065
§ 371 (c)(1),
(2) Date: Apr. 16, 2014

(87) PCT Pub. No.: WO2013/059621
PCT Pub. Date: Apr. 25, 2013

(65) Prior Publication Data
US 2014/0284884 A1    Sep. 25, 2014

Related U.S. Application Data

(60) Provisional application No. 61/549,535, filed on Oct. 20, 2011.

(51) Int. Cl.
*F16J 15/06* (2006.01)
*F16J 15/02* (2006.01)
*B64G 1/64* (2006.01)

(52) U.S. Cl.
CPC ............ *F16J 15/06* (2013.01); *B64G 1/646* (2013.01); *F16J 15/024* (2013.01)

(58) Field of Classification Search
CPC ......... F16J 15/02; F16J 15/021; F16J 15/022; F16J 15/025; F16J 15/028; F16J 15/06; F16J 15/10; F16J 15/104
See application file for complete search history.

(56) References Cited

U.S. PATENT DOCUMENTS

| | | | | |
|---|---|---|---|---|
| 5,172,919 A | * | 12/1992 | Takasaki | E04B 1/6801 277/644 |
| 5,390,939 A | * | 2/1995 | Terauchi | E21D 11/385 277/648 |
| 5,551,705 A | * | 9/1996 | Chen | F16J 15/024 277/648 |
| 6,129,485 A | | 10/2000 | Grabe et al. | |
| 6,267,536 B1 | | 7/2001 | Adachi et al. | |
| 6,305,695 B1 | * | 10/2001 | Wilson | F16J 15/024 277/584 |
| 2007/0063451 A1 | | 3/2007 | Yeager | |
| 2010/0199583 A1 | | 8/2010 | Behrens et al. | |

FOREIGN PATENT DOCUMENTS

EP     0421316 B1    9/1993

* cited by examiner

*Primary Examiner* — Gilbert Lee
(74) *Attorney, Agent, or Firm* — Renner Kenner Grieve Bobak Taylor & Weber

(57) ABSTRACT

A sealing construct for a space environment includes a seal-bearing object, a seal on the seal-bearing object, and a seal-engaging object. The seal includes a seal body having a sealing surface, and a textured pattern at the sealing surface, the textured pattern defining at least one shaded channel surface. The seal-engaging object is selectively engaged with the seal-bearing object through the seal. The seal-engaging object has a sealing surface, wherein, when the seal-engaging object is selectively engaged with the seal-bearing object, the sealing surface of the seal-engaging object engages the sealing surface of the seal, and the seal is compressed between the seal-bearing object and the seal-engaging object such that at least one shaded channel surface engages the sealing surface of the seal-engaging object.

16 Claims, 10 Drawing Sheets

SEALS HAVING TEXTURED PORTIONS FOR PROTECTION IN SPACE ENVIRONMENTS

CROSS-REFERENCE TO RELATED APPLICATIONS

The present application claims the benefit of U.S. Provisional Application No. 61/549,535, filed Oct. 20, 2011.

This invention was made with United States government support under contract NNC08CA35C awarded by the National Aeronautics and Space Administration (NASA). The U.S. government has certain rights in the invention.

FIELD OF THE INVENTION

The present invention generally relates to seals, and more particularly to seals and sealing constructs useful in space environments.

BACKGROUND OF THE INVENTION

Space docking systems are utilized to join two or more manned spacecraft together. They are designed to operate in low-Earth-orbit (LEO), in high-Earth-orbit (HEO), on extra-terrestrial surfaces, and in deep space locations. Space docking systems and other components of object exposed to space environments include seals in various locations, and these seals are sometimes exposed to the space environment. Some examples include seals at the main interface between two vehicles, at windows, and at fluid and electrical connections. Precious resources necessary for manned and unmanned spaceflight, such as potable water, coolant, and breathable air and refrigerant are retained and confined by seals. Any damage to or other compromising of the seal increases the leak rate and loss of the pressurized fluid or gas.

These seals must withstand multiple uses and hold up against the operational temperate extremes to which they are exposed, and are therefore manufactured from polymers. The polymers are negatively affected by the space environment, including solar radiation in the form of ultraviolet light and reactive elements such as atomic oxygen. The radiation and reactive elements (such as atomic oxygen) to which these seals are exposed compromises the sealing surfaces of the seal in short time spans.

It will be generally appreciated that the intensity of the radiation exposure can change during orbit. For example, FIG. 1A shows a seal 14 in solar inertial orbit about an astronomical object E (such as the planet Earth), the seal 14 having a sealing surface 18 extending or orthogonal to the direction of incoming radiation rays R as for example those coming from a star S (such as the sun). The seal 14 is schematically shown shaped as a trapezoid to show that the nature of solar inertial orbit is easily appreciated. In general, it can be seen that the orientation of the object, here just schematically represented by a seal 14, remains the same relative to a distance object, here represented by the star S, and changes relative to the astronomical body being orbited, here the astronomical body E. Thus, solar inertial orbit, the sealing surface 18 remains orthogonal to the rays R and, thus, unless hidden behind the astronomical object E, the sealing surface 18 receives the full intensity of the rays R.

A local vertical/local horizontal (LVLH) is schematically represented in FIG. 1B and the same numbering and lettering is employed to identify what is schematically represented therein. In LVLH orbit, the seal maintains its orientation relative the astronomical body E being orbited, and, thus, when not hidden behind the astronomical object E, the angle of incidence of the rays R on the sealing surface 18 changes. FIG. 2 shows a small portion of the non-textured sealing surface 18 and a location A thereon exposed to radiation rays during orbit. The relative orientation of point A to the source of solar radiation rays R and other reactive elements changes from point C to D to E. The normalized level of exposure at location A is shown in FIG. 3.

The exposure to radiation rays and to reactive elements in the space environment compromises the sealing surface and the seal in general. These seals tend to be formed of elastomers and the radiation and reactive elements cause the elastomer to become brittle and to erode at the molecular level, shrinking and cracking. Cracked surfaces do not form good seals. This compromises the functioning of the seal. Mission profile and duration is limited by the polymer seal's ability to resist the space environment. Currently, there are no polymer seals that can resist the space environment for greater than 4 days. Therefore, there is a need in the art to improve upon the ability of a seal to resist the detrimental effects of the space environment.

SUMMARY OF THE INVENTION

A first embodiment of this invention provides a sealing construct for a space environment comprising: a seal-bearing object; a seal on said seal-bearing object, said seal including: a seal body having a sealing surface, a textured pattern at the sealing surface, said textured pattern defining at least one shaded channel surface; and a seal-engaging object selectively engaged with said seal-bearing object through said seal, said seal-engaging object having a sealing surface, wherein, when said seal-engaging object is selectively engaged with said seal-bearing object, said sealing surface of said seal-engaging object engages said sealing surface of said seal, and said seal is compressed between the seal-bearing object and the seal-engaging object such that at least one shaded channel surface engages said sealing surface of said seal-engaging object.

A second embodiment provides a sealing construct as in the first embodiment, wherein the textured patter is shaped such that while orbiting in a space environment and while said seal-engaging object is not selectively engaged with said seal-bearing object, the at least one shaded channel surface is exposed to the space environment less than said sealing surface is exposed to the space environment.

A third embodiment provides a sealing construct as in either the first or second embodiment, wherein said textured pattern includes a plurality of channels formed into the seal body and opening at said seal surface.

A fourth embodiment provides a sealing construct as in any of the first through third embodiments, wherein each of the said channels include a floor surface and opposed wall surfaces extending upward from said floor surface, said floor surface and said opposed wall surfaces serving as said at least one shaded channel surface.

A fifth embodiment provides a sealing construct as in any of the first through fourth embodiments, wherein the seal-engaging object engages said floor surface of said channel.

A sixth embodiment provides a sealing construct as in any of the first through fifth embodiments, wherein said floor surface of said channel is shaped in a manner selected from the group consisting of flat, concave, convex, slanted and combinations thereof.

A seventh embodiment provides a sealing construct as in any of the first through sixth embodiments, wherein said textured pattern includes a plurality of protrusions extending from said sealing surface of the seal.

A eighth embodiment provides a sealing construct as in any of the first through seventh embodiments, wherein the protrusions include floor surfaces and opposed side wall surfaces which extend downwards from the floor surface and which define at least one shaded sealing surface portion.

A ninth embodiment provides a seal exposed to a space environment, such that the seal is exposed to changing angles of incidence of radiation and/or reactive elements, the seal comprising: a seal body having a sealing surface, and a textured pattern at said sealing surface, said textured pattern defining at least one shaded channel surface.

A tenth embodiment provides a seal as in the ninth embodiment, wherein while in a space environment the at least one shaded channel surface is exposed to the space environment less than said sealing surface is exposed to the space environment.

An eleventh embodiment provides a seal as in any of the ninth or tenth embodiments, wherein the textured pattern includes a plurality of channels formed into the seal body and opening at said seal surface.

A twelfth embodiment provides a seal as in any of the ninth through eleventh embodiments, wherein each of the said channels comprises a floor surface and opposed wall surfaces extending upward from said floor surface.

A thirteenth embodiment provides a seal as in any of the ninth through twelfth embodiments, wherein a seal engaging surface of an engaging object engages with the at least one shaded channel surface at the floor surface of said at least one shaded channel surface.

A fourteenth embodiment provides a seal as in any of the ninth through thirteenth embodiments, wherein the textured pattern at the sealing surface is selected from the group consisting of a square bottom, a concave bottom, a convex bottom, a slanted bottom, or a combination.

A fifteenth embodiment provides a seal as in any of the ninth through fourteenth embodiments, wherein the textured pattern includes a plurality of protrusions extending from said sealing surface of the seal.

A sixteenth embodiment provides a seal as in any of the ninth through fifteenth embodiments, wherein each of the said protrusions comprises a floor surface and opposed wall surfaces extending downward from said floor surface.

DETAILED DESCRIPTION OF ILLUSTRATIVE EMBODIMENTS

Figure 4:
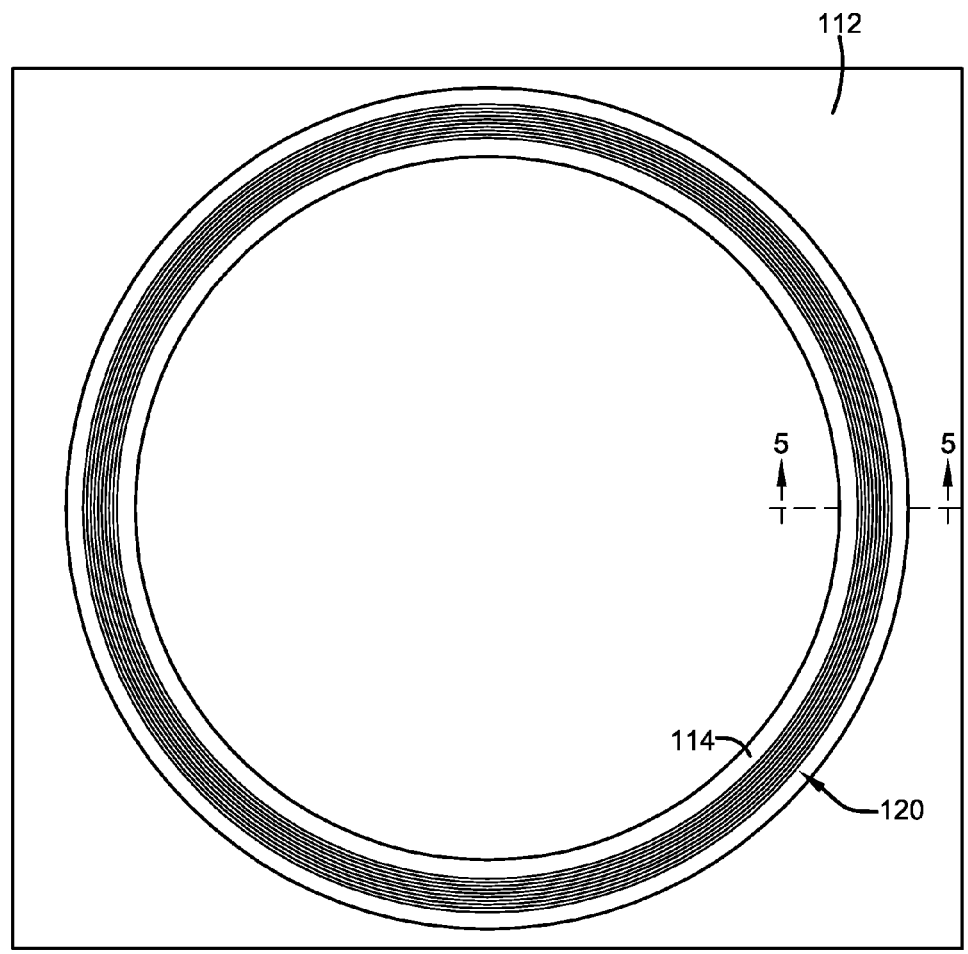
FIG. 4 is a schematic representation of an embodiment of the sealing construct in a front elevation view, but with a portion thereof, namely a seal-engaging member, not shown.
Figure 5:
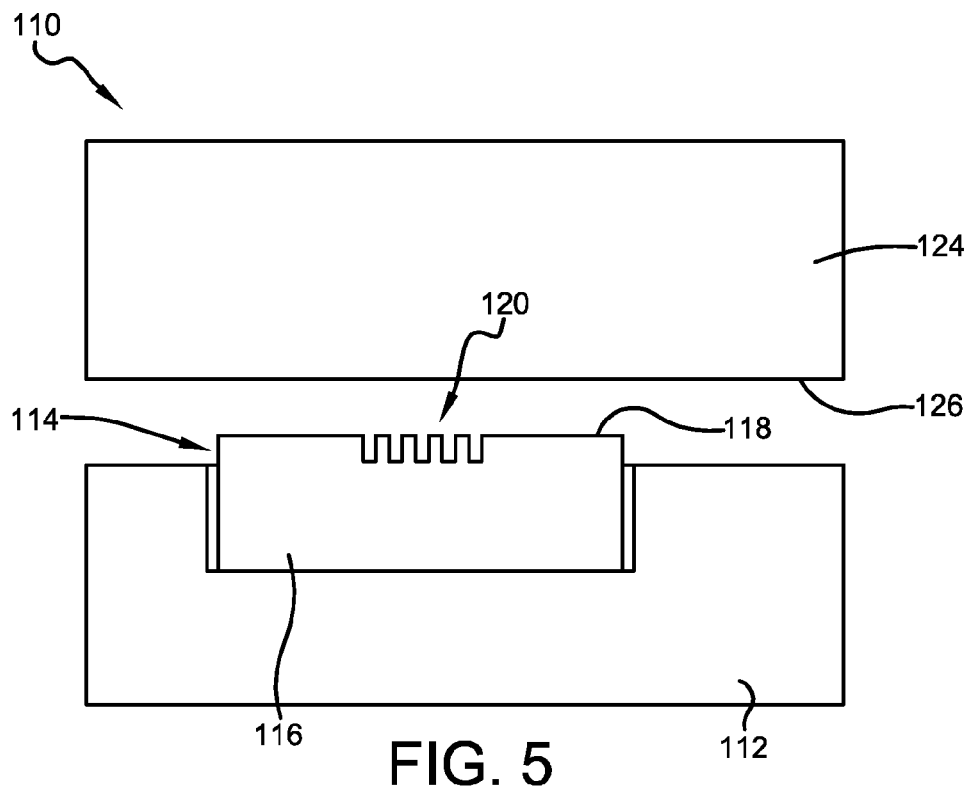
FIG. 5 is a schematic representation of a cross section of the sealing construct employing channels, taken along the line 5-5 of FIG. 4.

Portions of an embodiment of a sealing construct in accordance with this invention are shown in a front elevation view in FIG. 4, and the entire sealing construct is shown in cross section in FIG. 5, the cross section being taken along the line 5-5 in FIG. 4 and further including a seal-engaging object 124 not visible in FIG. 4. FIG. 4 shows a seal-bearing object 112 having a seal 114 therein. As seen in FIG. 5, the sealing construct is designated by the numeral 110. The sealing construct 110 includes a seal-bearing object 112 and a seal 114 on the seal-bearing object 112. The seal 114 includes a seal body 116 having a sealing surface 118 and a textured pattern 120 at the sealing surface 118.

Figure 6:
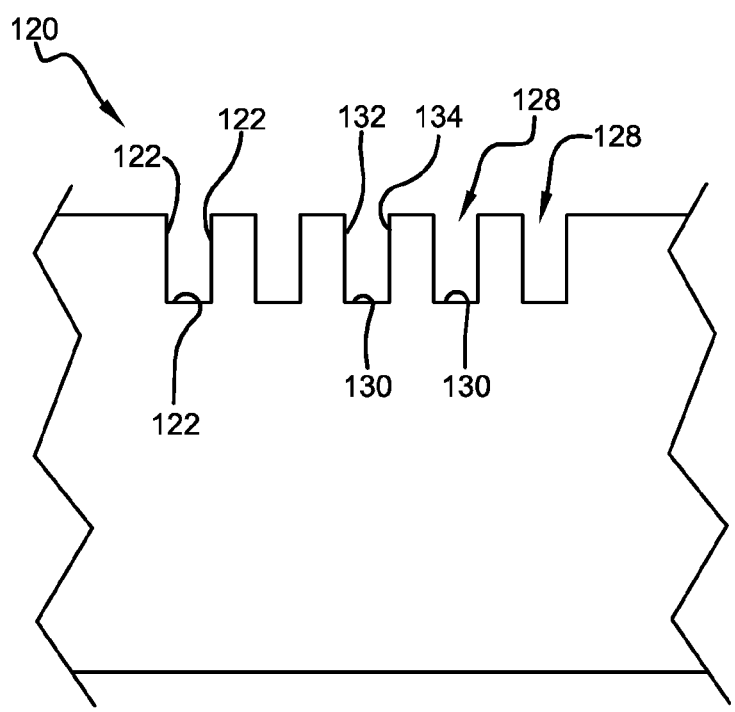
FIG. 6 is a schematic representation of an enlarged view of the textured pattern of a seal employing channels.

As seen in an enlarged view in FIG. 6, the textured pattern 120 defines at least one shaded channel surface 122. With reference back to FIG. 5, the sealing construct 110 also includes a seal-engaging object 124 that selectively engages with the seal-bearing object 112 through the seal 114. The seal-engaging object 124 has a sealing surface 126 that engages the sealing surface 118 of the seal 114, when the seal-engaging object 124 is selectively engaged with the seal-bearing object 112. The seal 114 is compressed between the seal-bearing object 112 and the seal-engaging object 124 such that at least one shaded channel surface 122 engages the sealing surface 126 of the seal-engaging object 124. By way of example, the seal-bearing object could be a space station having a docking location, and the seal would be provided at the docking location to provide an appropriate interface for engaging with another spacecraft in an appropriately sealed manner. The spacecraft docking with the space station would be the seal-engaging object described above. When they engage, they would form a sealing construct in accordance with this invention.

In the embodiment of FIGS. 4-6, the textured pattern 120 includes a plurality of channels 128 that are formed into the seal body 116 and which open at the sealing surface 118 of the seal 114. These channels 128 are defined by floor surfaces 130 and opposed side walls 132 and 134, which extend upwardly from the floor surfaces 130. It will be appreciated that the floor surfaces 130 and opposed side walls 132, 134 are shaded channel surfaces 122. These shaded channel surfaces improve the seal as will disclosed more fully directly below.

Figure 1A:
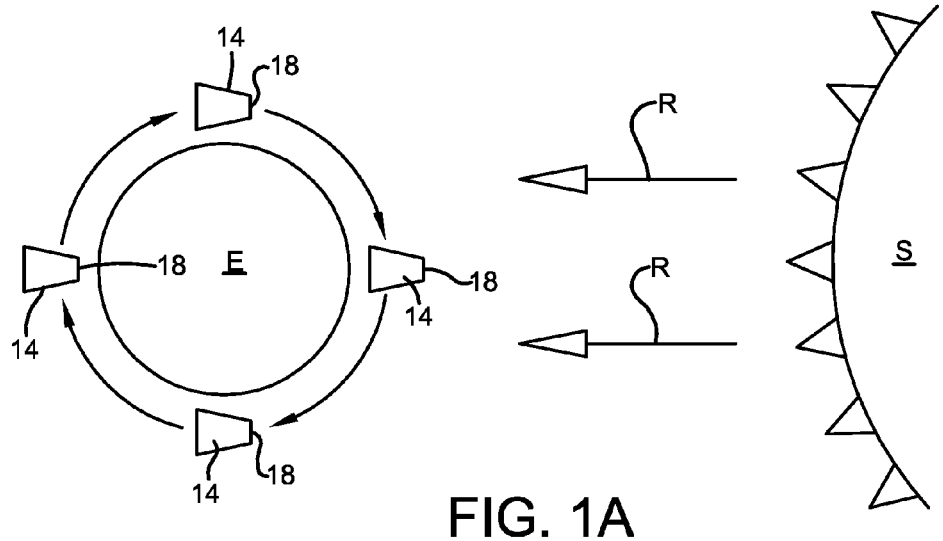
FIG. 1A shows a schematic of a seal in solar inertial orbit about an astronomical object.
Figure 1B:
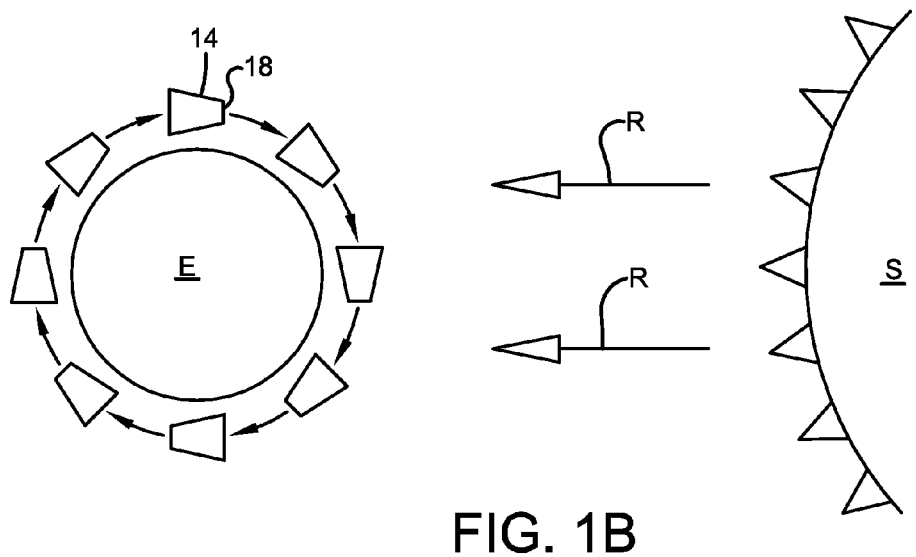
FIG. 1B shows a schematic of a seal in a local vertical/local horizontal (LVLH) orbit about an astronomical object.
Figure 2:
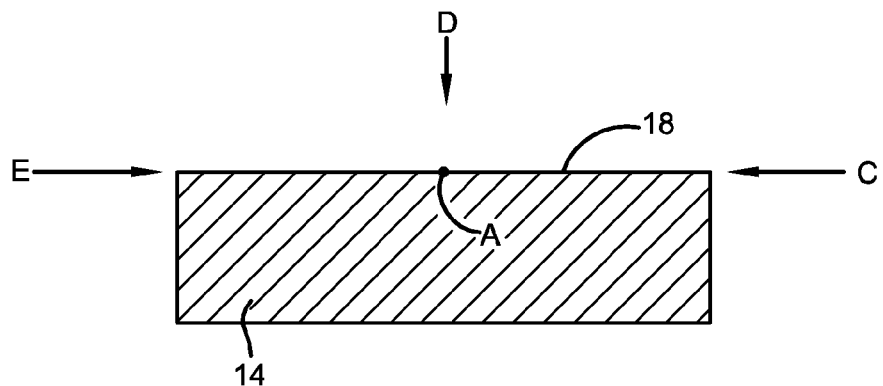
FIG. 2 is a schematic representation of a small portion of a non-textured sealing surface and a location A thereon exposed to radiation rays during orbit.
Figure 3:
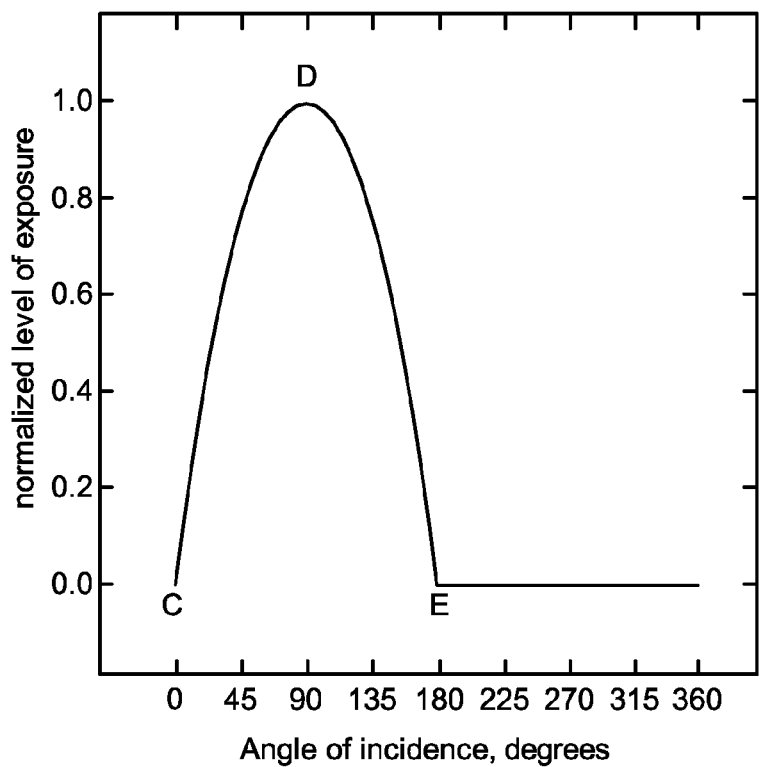
FIG. 3 shows a graphic schematic of the normalized level of exposure to solar radiation rays at a location A of FIG. 2.
Figure 7:
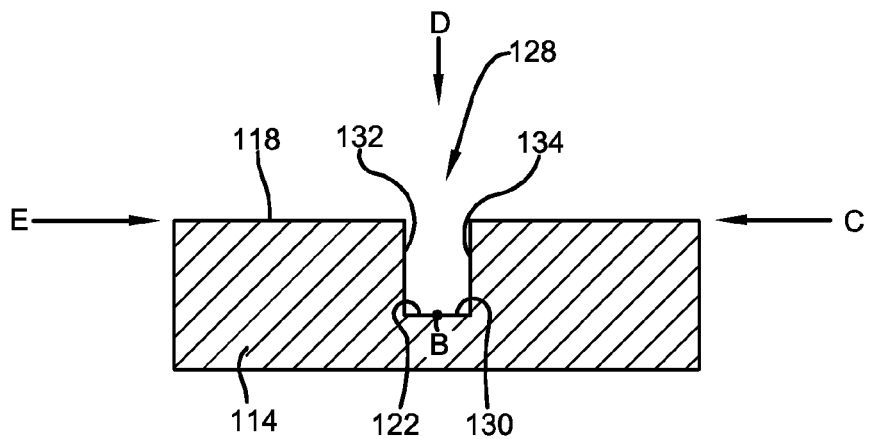
FIG. 7 is a schematic representation of a small portion of a textured sealing surface and a location B thereon exposed to radiation rays during LVHV orbit.
Figure 8:
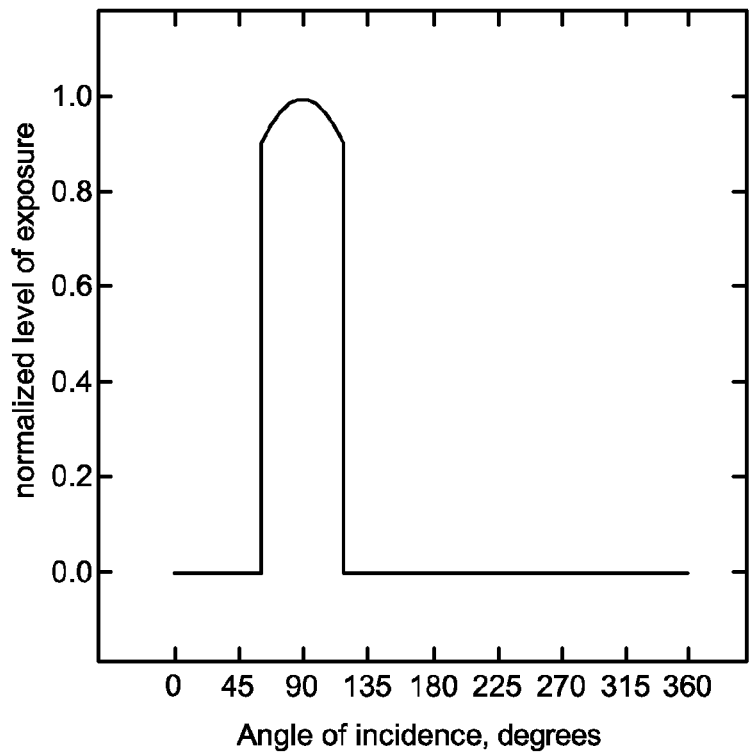
FIG. 8 shows a graphic schematic of the normalized level of exposure to solar radiation rays at a location B of FIG. 7.

In a comparison of FIGS. 2 and 3 with FIGS. 7 and 8, it can be seen that the shaded channel surfaces 122 receive a lesser amount of exposure to radiation rays R in an LVLH orbit such as that of FIG. 1B. As already noted, FIG. 2 shows a small portion of the non-textured sealing surface 18 and a location A thereon exposed to radiation rays during orbit. The relative orientation of point A to the source of solar radiation rays R and other reactive elements changes from point C to D to E. The normalized level of exposure at location A is shown in FIG. 3. In comparison, FIG. 7 shows a small representative portion of a seal 114 of this invention, showing the sealing surface 118 and a single channel 128 in the seal body 116, and a location B in the center of the width of the floor surface 130. The relative orientation of point B to the source of solar radiation rays R and other reactive elements changes from point C to D to E. The normalized level of exposure at location B is shown in FIG. 8. Location B is on a shaded channel surface 122. It is shaded by the opposed side walls 132, 134, and is thus not as exposed. It will be readily appreciated that the sidewalls 132, 134 are also shaded channel surfaces 122, and all of the shaded channel surface area receives a lesser exposure.

Figure 9A:
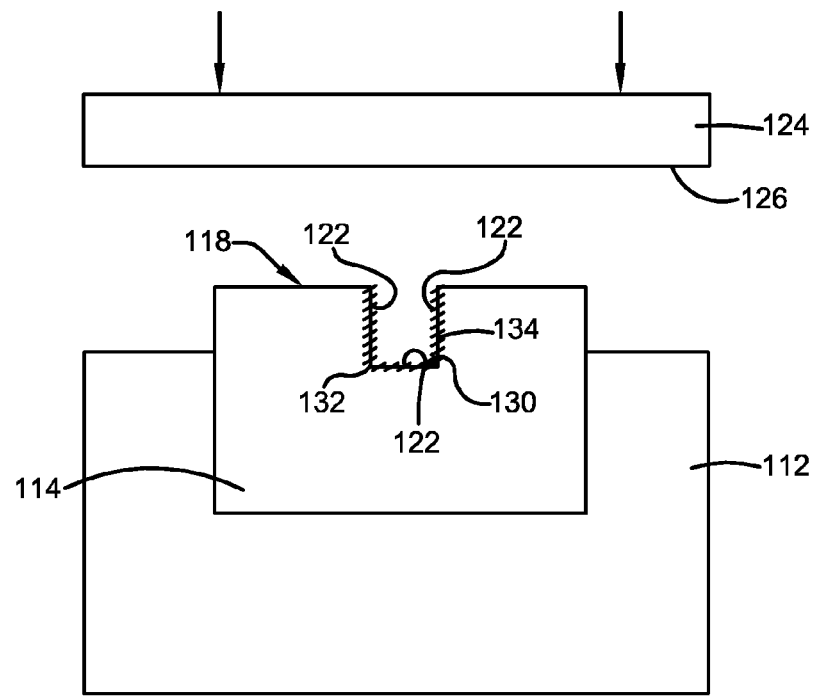
FIG. 9A is a schematic representation of the seal-engaging object about to be moved into engagement with a seal-bearing object employing a seal with a channel.
Figure 9B:
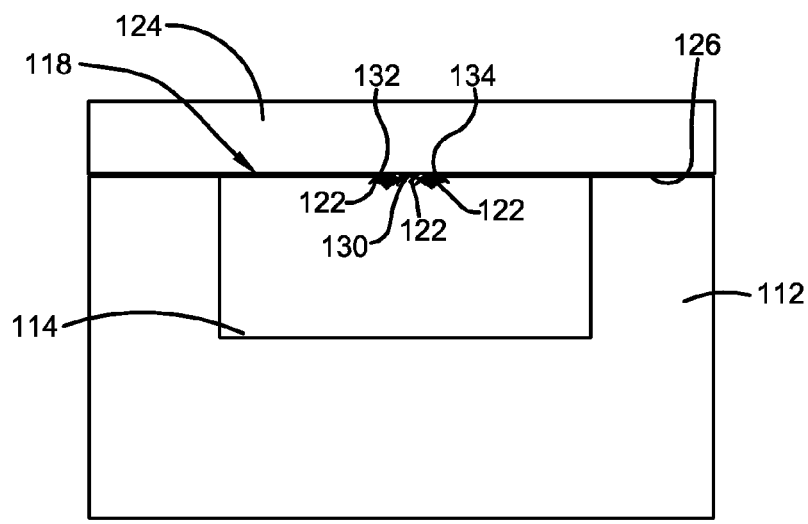
FIG. 9B is a schematic representation of the seal-engaging object engaged with a seal-bearing object employing a seal with a channel.

With this general understanding, the engagement of a seal-engaging object 124 with a seal-bearing object 112 is described with reference to FIGS. 9A and 9B. FIGS. 9A and 9B provide schematic views of a single channel in the seal 114 and show the engagement of the seal-engaging object 124 with the seal 114, carried on a seal-bearing object 112. In FIG. 9A, the seal-engaging object 124 is not in engagement with the seal 114, but the arrow represent that the seal-engaging object 124 is to be moved into such engagement. Indeed, the seal engaging object 124 bears down on the seal 114 so strongly as to compress the same and warp the channel 128, as seen in FIG. 9B. In FIG. 9A, diagonal hash lines are employed to help visually appreciate the shaded channel surfaces 122. Thus, it can be seen that, when the sealing surface 126 of the seal-engaging object 124 comes into contact with the seal 114 and bears down on it, the side walls 132 and 134 of the channel 128 are compressed and warped such that the seal-engaging object 124 engages with not only the shaded channel surfaces 122 of side walls 132 and 134, but also the shaded channel surface 122 of the floor surface 130. Because the shaded channel portions 122 of the seal 114 are less compromised, as already described above, a stronger and therefore better seal is created with the seal-engaging object 124, as compared to prior seals.

Figure 10:
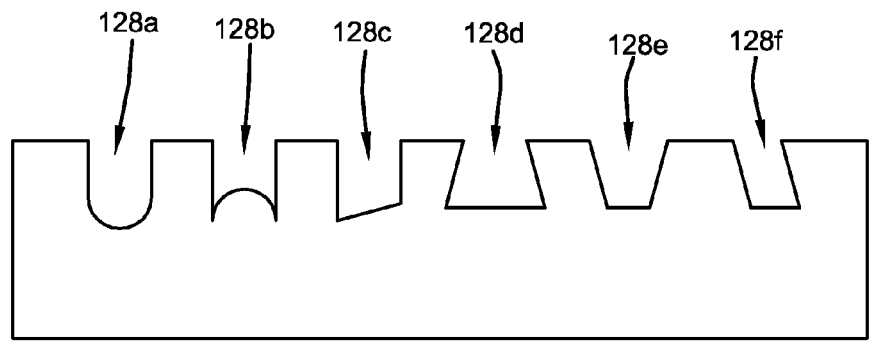
FIG. 10 is a schematic representation of multitude of channel shapes.

Although the presently disclosed embodiment has shown channels of rectangular cross-section, it should be noted that the channels can be otherwise shaped, as provided by example in FIG. 10, showing a multitude of channel shapes at channels 128a, 128b, 128c, 128d, 128e, and 128f. In some embodiment, the floor surface of the channel 128 can be shaped in a manner selected from the group consisting of flat, concave, convex, slanted and combinations thereof. The sidewalls can be shaped to for orthogonal angles with the floor, acute angles with the floor, and obtuse angles with the floor, and one side wall might form one type of angle while the other forms a different type of angle.

The textured pattern 120 is shown in FIG. 4 as being located only at a mid-section of the width of the sealing surface 118 of the seal 114, but it should be appreciated that the channels 128 can be repeated along the entire width of the seal 114. Alternatively, the textured pattern 120 in the form of channels 128 can be provided in clusters at one or more distinct locations such that the sealing surface alternates between textured portions and non-textured portions across its width. The location or locations of the textured pattern need not be in the middle of the seal, but could be biased toward one side or the other or spread out along the width. The clusters will include 1 or more channels. In some embodiments, each cluster will include 2 or more channels. In some embodiments, the textured pattern, whether at one location or at multiple distinct locations, extends across greater than 2% of the width of the seal. In other embodiments, the textured pattern(s) extend across greater than 10%, in other embodiments, greater than 20%, in other embodiments greater than 25%, in other embodiments, greater than 30%, and in other embodiments, greater than 40%, in other embodiments, greater than 50% of the width of the seal. In other embodiments, the textured pattern(s) extend across less than 100%, in other embodiments, less than 90%, in other embodiments, less than 80%, in other embodiments, less than 70%, and in other embodiments, less than 60% of the width of the seal.

Figure 11:
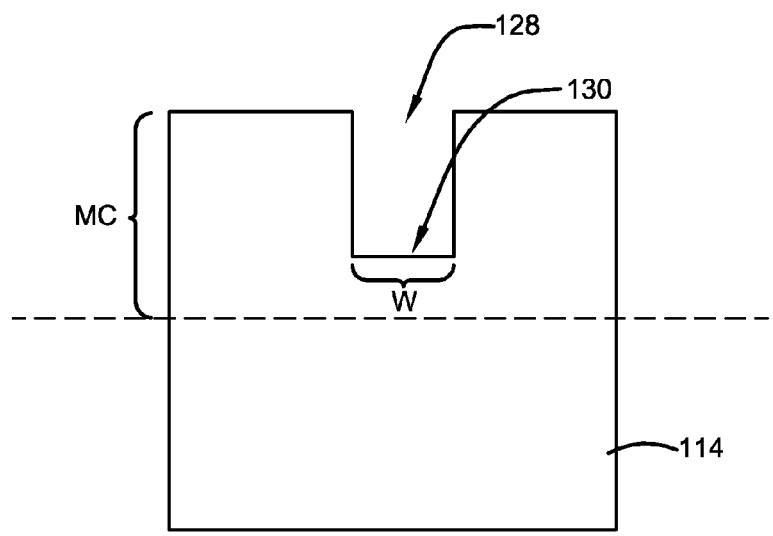
FIG. 11 is a schematic representation of the dimensions of a small representative portion of the textured pattern of a seal employing a channel.

With reference to FIG. 11, guidance is provided as to the selection of particular dimensions for a channel in accordance with some embodiments of this invention. The seal 114 is shown with a channel 128 having a width W and depth D. In some embodiments, the channel 128 will "bottom" out upon compression (i.e., the sealing surface 126 of the seal-engaging object 124 will contact the floor surface 130 of one or more channels 128; however, in other embodiments, this need not occur, because the shaded surfaces of the side walls 132 and 134 will contact the sealing surface 126 of seal-engaging object 124 thus creating a seal, without requiring that the channel bottom out. In some embodiments, it is preferred that the sealing surface 126 of the seal-engaging object 124 engage the floor surface 130 of one or more channels 128.

In some embodiments, there is a correlation between the depth D of the channel 128 and the magnitude of compression MC (i.e., the distance by which the sealing surface is compressed) achieved by the seal-engaging object 124. In some embodiments D is less than 100% of MC, in other embodiments, D is less than 90%, in other embodiments, less than 80%, in other embodiments, less than 70%, in other embodiments, less than 60%, in other embodiments, less than 50%, in other embodiments, less than 40%, in other embodiments, less than 30% of MC. In some non-rectangular channel embodiments, such as those exemplified in FIG. 10, the highest point of the floor of the channel is considered for assessing the depth for the purpose of comparing D to MC, as above. In some embodiment, MC is more than 50% of D, in other embodiments, more that 60%, in other embodiments, more than 70%, in other embodiments, more that 80%, in other embodiments, more that 90%, and, in other embodiments, more that 100% of D.

In some embodiments, the channels are narrowly spaced such that the channel width and the channel spacing are the same, and the seal is compressed at 50% of D to engage the floor of the channel, it being understood that the compression of the material will displace material, causing the floor to be forced toward the seal-engaging object. In some embodiments, the channels are widely spaced, and the seal is compressed at 100% of D or more to engage the floor of the channel. In some embodiments, there are very few channels, and the seal is compressed at 100% of D or more to engage the floor of the channel.

In some embodiments, the ratio of W to D, W/D is from 1/10 to 10/1. In other embodiments, the ratio W/D is from 1/5 to 5/1, in other embodiments, from 1/3 to 3/1, and in other embodiments, from 1/2 to 2/1. In yet other embodiments, W/D is from 2/1 to 1/10, in other embodiments, the ratio W/D is from 1/1 to 1/4, in other embodiments, from 1/1 to 1/2. In some embodiments, there are channels 128 of different W/D ratios in the same seal.

Figure 12:
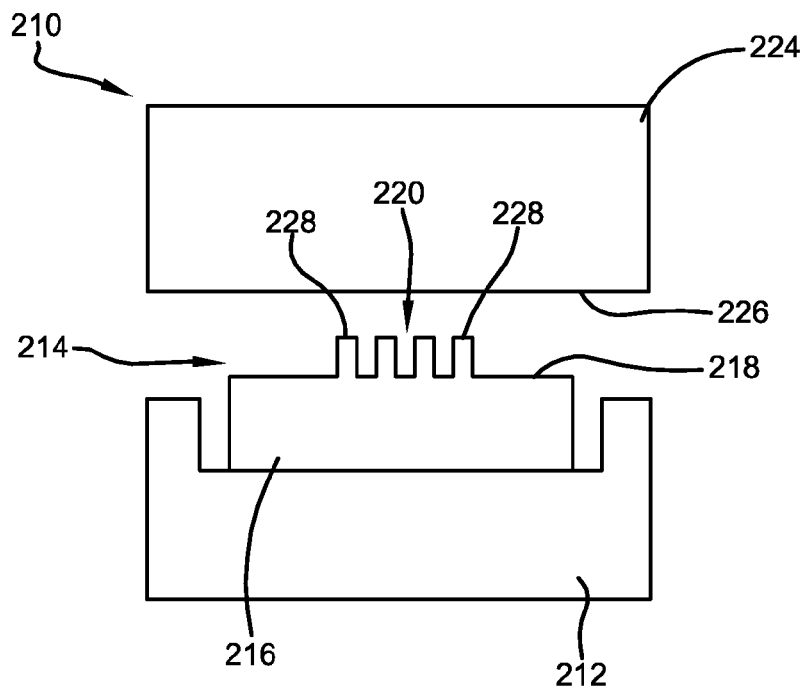
FIG. 12 is a schematic representation of a cross section of the sealing construct employing protrusions.

A second embodiment of a sealing construct in accordance with this invention is shown in FIG. 12 and designated by the numeral 210. The sealing construct 210 includes a seal-bearing object 212 and a seal 214 on the seal-bearing object 212. The seal 214 includes a seal body 216 having a sealing surface 218 and a textured pattern 220 at the sealing surface 218. In this embodiment, the textured pattern 220 is provided by a plurality of protrusions 228 that are formed extending upwardly from the sealing surface 218. These protrusions 228 are defined by top surfaces 230 and opposed side walls 232 and 234, which extend downwardly from the top surfaces 230, as shown in FIG. 13.

Figure 13:
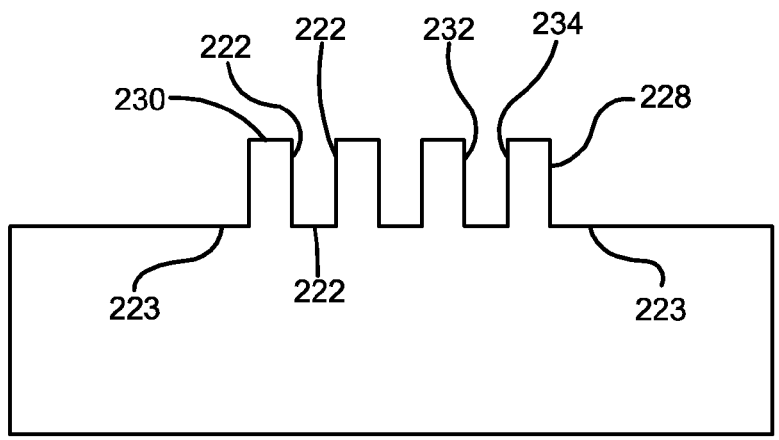
FIG. 13 is a schematic representation of an enlarged view of the textured pattern of a seal employing protrusions.
Figure 14:
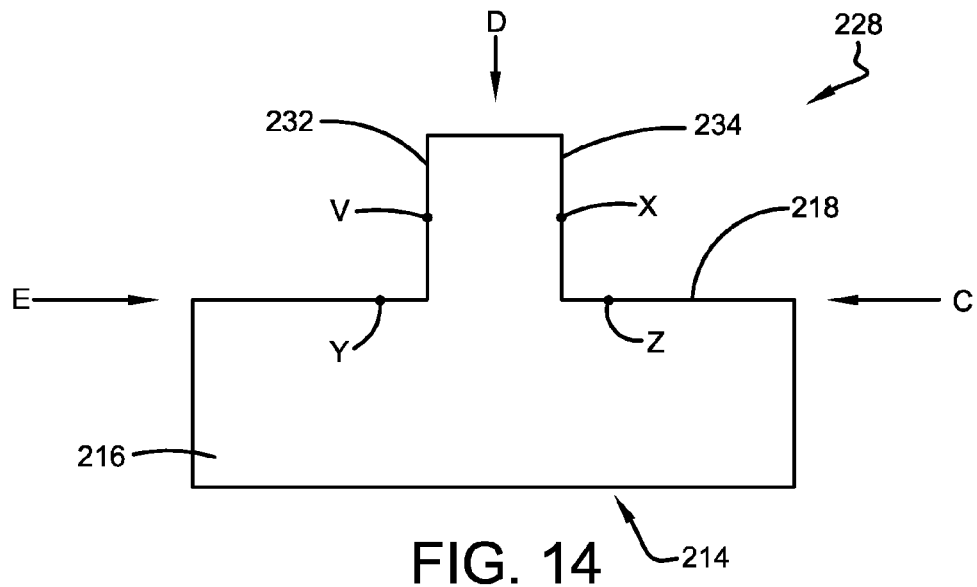
FIG. 14 is a schematic representation of a small portion of a textured sealing surface and locations V, X, Y and Z thereon exposed to radiation rays during LVHV orbit.

As seen in an enlarged view in FIG. 13, a protrusion 228 defines at least one shaded protrusion surface, as at 222, and also defines shaded sealing surfaces 223. This can be appreciated with reference to FIG. 14, which is similar to FIG. 7, but shows an LVLH orbit relative to seal 214. FIG. 14 shows a small representative portion of a seal 214 of this invention, showing the sealing surface 218 and a single protrusion 228 extending from the sealing surface 218 of the seal body 216. Location V is designated in the center of the height of the sidewall 232, location X is designated at the center of the height of sidewall 234, locations Y is designated on the sealing surface slightly spaced from the sidewall 232, and location Z is designated on the sealing surface slightly spaced from the sidewall 234. The relative orientation of points V, X, Y and Z to the source of solar radiation rays R and other reactive elements changes from point C to D to E. It will be appreciated that as the orientation changes from point C to D, locations V and Y are shaded, and as the orientation changes from point D to E, locations X and Z are shaded. Thus, the protrusion 228 provides shaded protrusion surfaces and shaded sealing surfaces, which should be understood as shaded portions of the sealing surface 218.

With reference back to FIG. 12, the sealing construct 210 also includes a seal-engaging object 224 that is selectively engaged with the seal-bearing object 212 through the seal 214. The seal-engaging object 224 has a sealing surface 226 that engages the sealing surface 218 of the seal 214, when the seal-engaging object 224 is selectively engaged with the seal-bearing object 212. The seal 214 is compressed between the seal-bearing object 212 and the seal-engaging object 224 such that at least one shaded channel surface 222 engages the sealing surface 226 of the seal-engaging object 224.

Figure 15A:
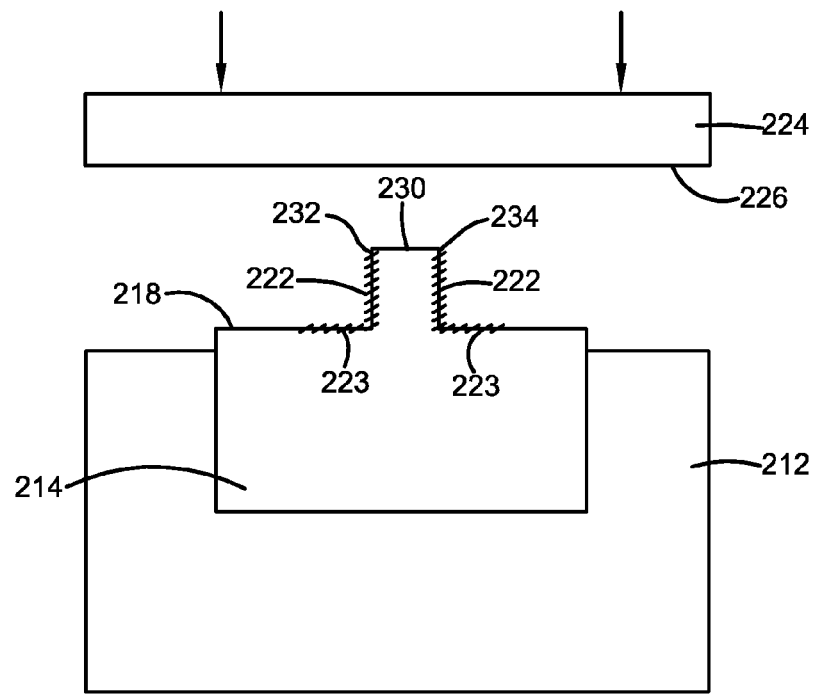
FIG. 15A is a schematic representation of the seal-engaging object about to be moved into engagement with a seal-bearing object employing a seal with a protrusion.
Figure 15B:
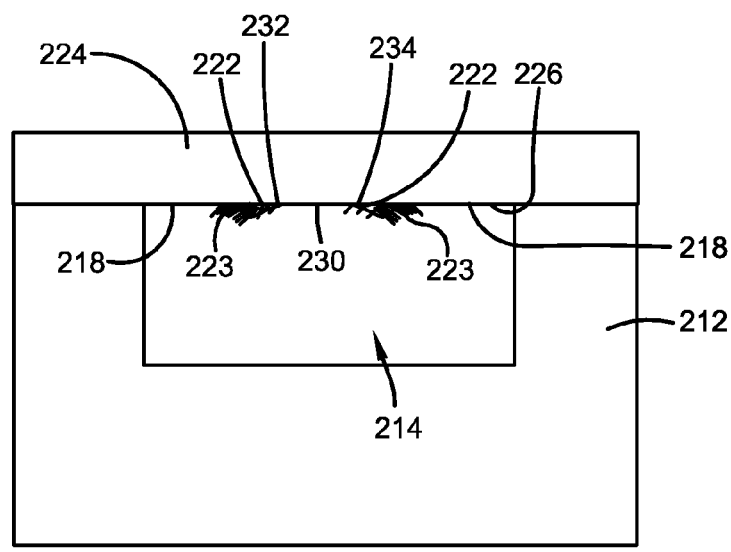
FIG. 15B is a schematic representation of the seal-engaging object engaged with a seal-bearing object employing a seal with a protrusion.

With this general understanding, the engagement of a seal-engaging object 224 having a sealing surface 226 with a seal-bearing object 212 is described with reference to FIGS. 15A and 15B. FIGS. 15A and 15B provide schematic views of a single channel in the seal 214 and show the engagement of the seal-engaging object 224 with the seal 214, carried on a seal-bearing object 212. In FIG. 15A, the seal-engaging object 224 is not in engagement with the seal 214, but the arrows represent that the seal-engaging object 224 is to be moved into such engagement. Indeed, the seal engaging object 224 bears down on the seal 214 so strongly as to compress and warp the protrusions 228 and contact and at least slightly compress the sealing surface 218 downwardly (in the direction of FIG. 15A), as seen in FIG. 15B. In FIG. 15A, diagonal hash lines are employed to help visually appreciate the shaded protrusion surfaces 222 and shaded sealing surfaces 223. Notably, though all of the sealing surface is shaded for at least some degree, the diagonal lines are provided in the small area adjacent the protrusions because that are will be most shaded from the changing angles of incidence of the radiation. Thus, it can be seen that, when the sealing surface 226 of the seal-engaging object 224 comes into contact with the seal 214 and bears down on it, the side walls 232 and 234 and the top surface 230 of the protrusion 228 are compressed and warped such that the seal-engaging object 224 engages with at least a portion of the shaded channel surfaces 222 of side walls 232 and 234 and the shaded sealing surfaces 223. Because the shaded portion of the seal 214 are less compromised, as already described above, a stronger and therefore better seal is created with the seal-engaging object 224.

Figure 16:
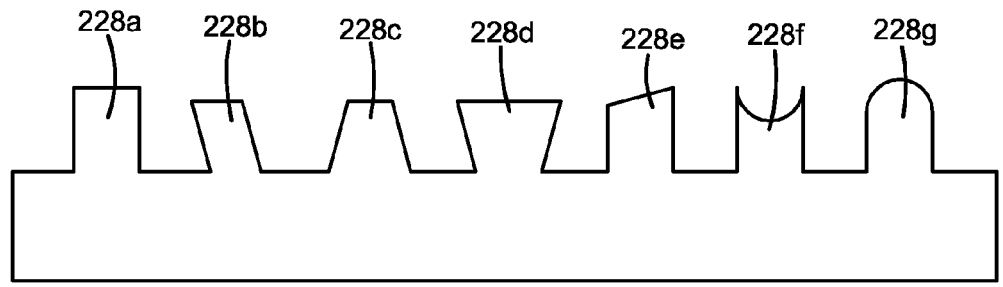
FIG. 16 is a schematic representation of a multitude of protrusion shapes.

Although the presently disclosed embodiment has shown protrusions of rectangular cross-section, it should be noted that the protrusions can be otherwise shaped, as provided by example in FIG. 16, showing a multitude of protrusion shapes at protrusions 228a, 228b, 228c, 228d, 228e, 228f, 228g. In some embodiment, the top surface of the protrusion 228 can be shaped in a manner selected from the group consisting of flat, concave, convex, slanted and combinations thereof. The sidewalls can be shaped to for orthogonal angles with the sealing surface, acute angles with the sealing surface, and obtuse angles with the sealing surface, and one side wall might form one type of angle while the other forms a different type of angle.

As disclosed above with respect to the textured pattern 120 that is shown in FIG. 4 as being located only at a mid-section of the width of the sealing surface 118 of the seal 114, it should be appreciated that the protrusions 228 can be repeated along the entire width of the seal 214. Alternatively the textured pattern 220 in the form of protrusions 228 can be provided in clusters at one or more distinct locations such that the sealing surface alternates between textured portions and non-textured portions across its width. The location or locations of the textured pattern need not be in the middle of the seal, but could be biased toward one side or the other or spread out along the width. The clusters will include 1 or more protrusions. In some embodiments, the clusters will include 2 or more protrusions. In some embodiments, the textured pattern, whether at one location or at multiple distinct locations, extends across greater than 5% of the width of the seal. In other embodiments, the textured pattern(s) extend across greater than 10%, in other embodiments, greater than 20%, in other embodiments greater than 25%, in other embodiments, greater than 30%, and in other embodiments, greater than 40% in other embodiments, greater than 50% of the width of the seal. In other embodiments, the textured pattern(s) extend across less than 100%, in other embodiments, less than 90%, in other embodiments, less than 80%, in other embodiments, less than 70%, and in other embodiments, less than 60% of the width of the seal.

Figure 17:
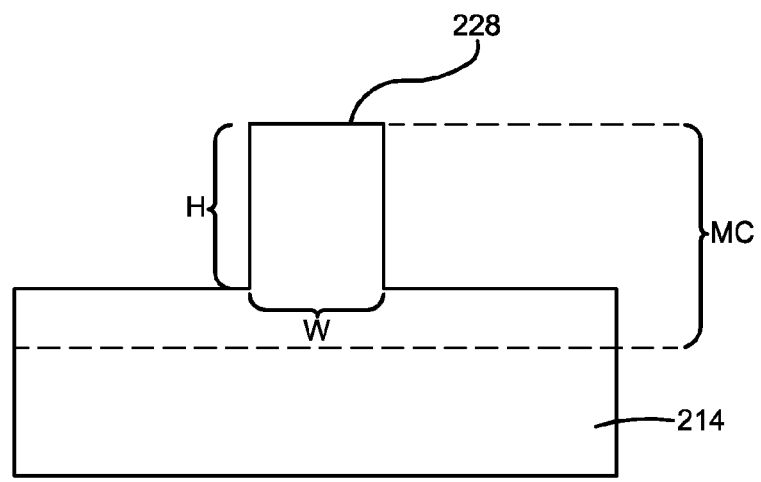
FIG. 17 is a schematic representation of the dimensions of a small representative portion of the textured pattern of a seal employing a protrusion.

With reference to FIG. 17, guidance is provided as to the selection of particular dimensions for a protrusion in accordance with some embodiments of this invention. The seal 214 is shown with a protrusion 228 having a width W and height H. In some embodiments, there is a correlation between the height H of the protrusion 228 and the magnitude of compression MC (i.e., the distance by which the sealing surface is compressed) achieved by the seal-engaging object 224. In some embodiments the H is less than less than 100% of MC, in other embodiments, H is less than 90%, in other embodiments, less than 80%, in other embodiments, less than 70%, in other embodiments, less than 60%, in other embodiments, less than 50%, in other embodiments, less than 40%, in other embodiments, less than 30% of MC. In some non-rectangular protrusion embodiments, such as those exemplified in FIG. 10, the highest point of the protrusion is considered for assessing the depth for the purpose of comparing H to MC, as above. In some embodiment, MC is more than 50% of H, in other embodiments, more that 60%, in other embodiments, more than 70%, in other embodiments, more that 80%, in other embodiments, more that 90%, and, in other embodiments, more that 100% of H.

In some embodiments, the protrusions are narrowly spaced such that the protrusion width and spacing are the same, and the seal is compressed at 50% of H to engage the sealing surface of the seal, it being understood that the compression of the material will displace material, causing the sealing surface to be forced toward the seal-engaging object, i.e., forcing the protrusions into the body below the sealing surface can cause the sealing surface to be forced toward the seal-engaging body. In some embodiments, the protrusions are widely spaced, and the seal is compressed at 100% of H or more to engage the sealings surface of the seal. In some embodiments, there are very few protrusions, and the seal is compressed at 100% of D or more to engage the sealing surface of seal.

In some embodiments, the ratio of W to H, W/H is from 1/10 to 10/1. In other embodiments, the ratio W/H is from 1/5 to 5/1, in other embodiments, from 1/3 to 3/1, and in other embodiments, from 1/2 to 2/1. In yet other embodiments, W/H is from 2/1 to 1/10, in other embodiments, the ratio W/H is from 1/1 to 1/4, in other embodiments, from 1/1 to 1/2. In some embodiments, there are protrusions 128 of different W/H ratios in the same seal.

The seal 114 of the sealing construct 110 is formed of any suitably compressible material for use in space environments. These will be generally known, and the advantages of the present invention result from the textured patterns formed in the seals. In some embodiments, the material of the seal is an elastomer. In some embodiments, the elastomer is selected from the group consisting of butyl rubber, silicone, fluorocarbon, polyurethane, nitrile, neoprene, ethylene propylene, fluorosilicone, natural rubber, butadiene, polytetrafluoroethylene, styrene-butadiene, fluorinated ethylene propylene.

In a specific embodiment, the seal 114 is a docking seal, made of silicone elastomer, such as S0383-70 (Momentive Performance Materials). The seal 114 has a single cluster of 5 channels, each with a width (W) of 100 microns and depth (D) of 200 microns (W/D=1/2). This cluster is located at the center of the sealing surface and extend across 26% of the width of the seal.

It should be appreciated that, in some embodiments, the sealing surface of the seal-engaging object could be provided by another textured seal in accordance with this invention, the sealing construct thus being formed by engagement of two seals in accordance with the teaching herein.

It should further be appreciated that the textured pattern need not follow the shape of the seal, as it does in FIG. 4. Additionally the seals can be of varying shape, the circular seal being shown by way of example only.

It should be noted that the channels and protrusions provide benefits with respect to radiation and reactive element shrinking and cracking of the seals. By breaking up the sealing surface, the contiguous area affected by the radiation/reactive elements is lessened, and, as the shrinking and cracking is partially a function of the area affected, it has been found that the shrinking and cracking is much reduced.

Though LVLH orbit has been a particular focus herein, it will be appreciated that the present invention provides improved seals for solar inertial orbits as well. Particularly, even if the floor of a channel or the top of a protrusion is directed orthogonal to incoming rays, the sidewalls will not receive a great deal of radiation, and thus, upon compression, the sidewalls will engage the sealing surface of the seal-engaging object and effect a better seal than that which would be experience with a non-textured seal.

In light of the foregoing, it should be appreciated that the present invention significantly advances the art by providing a seal with a textured pattern for environmental protection, particularly useful in space environments. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A sealing construct for a space environment comprising:
a seal-bearing object;
a seal on said seal-bearing object, said seal including:
a seal body having a sealing surface,
a textured pattern at the sealing surface, said textured pattern defining at least one shaded channel surface; and
a seal-engaging object selectively engaged with said seal-bearing object through said seal, said seal-engaging object having a sealing surface, wherein, when said seal-engaging object is selectively engaged with said seal-bearing object, said sealing surface of said seal-engaging object engages said sealing surface of said seal, said seal is compressed between the seal-bearing object and the seal-engaging object such that at least one shaded channel surface engages said sealing surface of said seal-engaging object, and wherein said sealing construct forms both a liquid and gas restraining barrier.

2. The sealing construct of claim 1 wherein the textured pattern is shaped such that while orbiting in a space environment and while said seal-engaging object is not selectively engaged with said seal-bearing object, the at least one shaded channel surface is exposed to the space environment less than said sealing surface is exposed to the space environment.

3. The sealing construct of claim 1 wherein said textured pattern includes a plurality of channels formed into the seal body and opening at said seal surface.

4. The sealing construct of claim 3, wherein each of the said channels include a floor surface and opposed wall surfaces extending upward from said floor surface, said floor surface and said opposed wall surfaces serving as said at least one shaded channel surface.

5. The sealing construct of claim 3 wherein the seal-engaging object engages said floor surface of said channel.

6. The sealing construct of claim 3 wherein said floor surface of said channel is shaped in a manner selected from the group consisting of flat, concave, convex, slanted and combinations thereof.

7. The sealing construct of claim 1, wherein said textured pattern includes a plurality of protrusions extending from said sealing surface of the seal.

8. The sealing construct of claim 7, wherein the protrusions include floor surfaces and opposed side wall surfaces which extend downwards from the floor surface and which define at least one shaded sealing surface portion.

9. A seal exposed to a space environment, such that the seal is exposed to changing angles of incidence of radiation and/or reactive elements, the seal comprising:

a. a seal body having a sealing surface, and
b. textured pattern at said sealing surface, said textured pattern defining at least one shaded channel surface, and wherein said seal forms both a liquid and gas restraining barrier.

10. The seal of claim 9 wherein while in a space environment the at least one shaded channel surface is exposed to the space environment less than said sealing surface is exposed to the space environment.

11. The seal of claim 9 wherein the textured pattern includes a plurality of channels formed into the seal body and opening at said seal surface.

12. The seal of claim 11 wherein each of the said channels comprises a floor surface and opposed wall surfaces extending upward from said floor surface.

13. The seal of claim 9 wherein a seal engaging surface of an engaging object engages with the at least one shaded channel surface at the floor surface of said at least one shaded channel surface.

14. The seal of claim 9 wherein the textured pattern at the sealing surface is selected from the group consisting of a square bottom, a concave bottom, a convex bottom, a slanted bottom, or a combination.

15. The seal of claim 9 wherein the textured pattern includes a plurality of protrusions extending from said sealing surface of the seal.

16. The seal of claim 15 wherein each of the said protrusions comprises a floor surface and opposed wall surfaces extending downward from said floor surface.

* * * * *